United States Patent
Sugiyama

(10) Patent No.: US 11,543,422 B2
(45) Date of Patent: Jan. 3, 2023

(54) AUTOMATIC ANALYSIS SYSTEM

(71) Applicant: SHIMADZU CORPORATION, Kyoto (JP)

(72) Inventor: Kiyohiro Sugiyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 958 days.

(21) Appl. No.: 16/326,468

(22) PCT Filed: Aug. 25, 2016

(86) PCT No.: PCT/JP2016/074839
§ 371 (c)(1),
(2) Date: Feb. 19, 2019

(87) PCT Pub. No.: WO2018/037537
PCT Pub. Date: Mar. 1, 2018

(65) Prior Publication Data
US 2021/0293837 A1    Sep. 23, 2021

(51) Int. Cl.
*G01N 35/00* (2006.01)

(52) U.S. Cl.
CPC ... *G01N 35/00732* (2013.01); *G01N 35/0092* (2013.01); *G01N 2035/0096* (2013.01);
(Continued)

(58) Field of Classification Search
CPC ......... G01N 35/00732; G01N 35/0092; G01N 2035/00831; G01N 2035/00851; G01N 2035/0096; G01N 35/00871
See application file for complete search history.

(56) References Cited

U.S. PATENT DOCUMENTS

2008/0028871 A1* 2/2008 Kitaoka ............. G01N 35/0092
422/50
2010/0248374 A1    9/2010 Kitagawa et al.
(Continued)

FOREIGN PATENT DOCUMENTS

CN    105229473 A    1/2016
EP    2 894 479 A1    7/2015
(Continued)

OTHER PUBLICATIONS

International Search Report for PCT/JP2016/074839 dated Nov. 15, 2016 [PCT/ISA/210].
(Continued)

*Primary Examiner* — Jill A Warden
*Assistant Examiner* — John McGuirk
(74) *Attorney, Agent, or Firm* — Sughrue Mion, PLLC

(57) ABSTRACT

The automatic analysis system comprises an analysis device which introduces sample containers which have been placed at a predetermined placement location into an analysis unit to perform analysis on the samples, and a management device which has a function of transmitting identification information for a sample to said analysis device when an analysis request has been made for that sample. The analysis device comprises a sample information management unit which retains sample identification information transmitted from the management device as analysis-requested sample information and retains identification information for samples which have been analyzed by the analysis unit as analysis-completed sample information.

8 Claims, 2 Drawing Sheets

(52) U.S. Cl.
CPC .............. *G01N 2035/00831* (2013.01); *G01N 2035/00851* (2013.01)

(56) References Cited

U.S. PATENT DOCUMENTS

| | | |
|---|---|---|
| 2012/0107793 A1 | 5/2012 | Tatsutani |
| 2012/0160039 A1* | 6/2012 | Tatsutani ........... G01N 35/0092 73/863.91 |
| 2016/0124010 A1 | 5/2016 | Makino et al. |
| 2018/0203027 A1* | 7/2018 | Yasuzawa .............. G01N 15/06 |

FOREIGN PATENT DOCUMENTS

| | | |
|---|---|---|
| EP | 3 012 635 A1 | 4/2016 |
| JP | 2012-93313 A | 5/2012 |
| WO | 2015/121919 A1 | 8/2015 |

OTHER PUBLICATIONS

Communication dated Sep. 6, 2019, issued by the European Patent Office in counterpart European application No. 16914211.4.

Office Action dated Nov. 17, 2021 from the China National Intellectual Property Administration in CN Application No. 201680088691.2.

Communication dated May 10, 2022 from the European Patent Office in EP Application No. 16914211.4.

\* cited by examiner (FIG. 1)
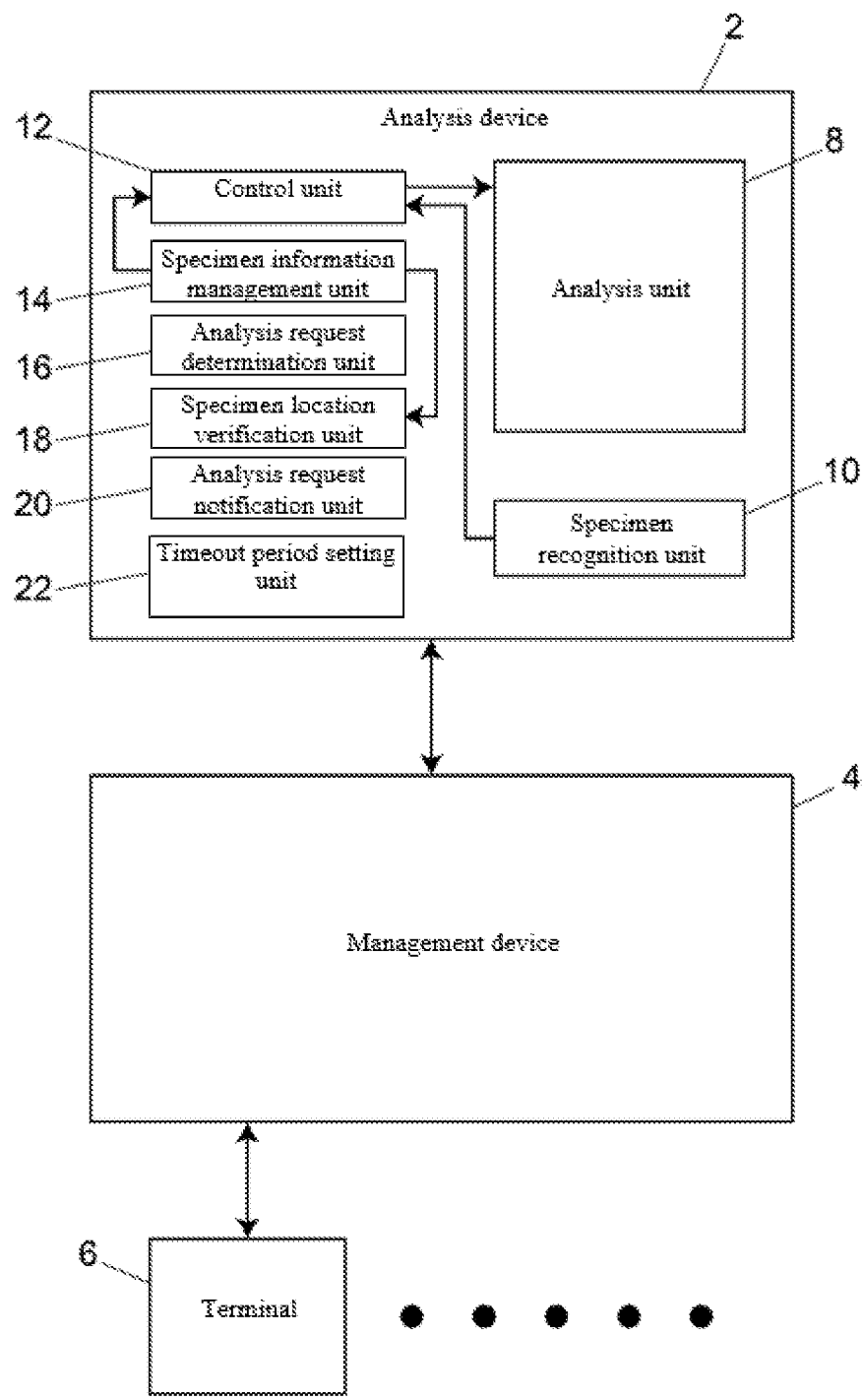

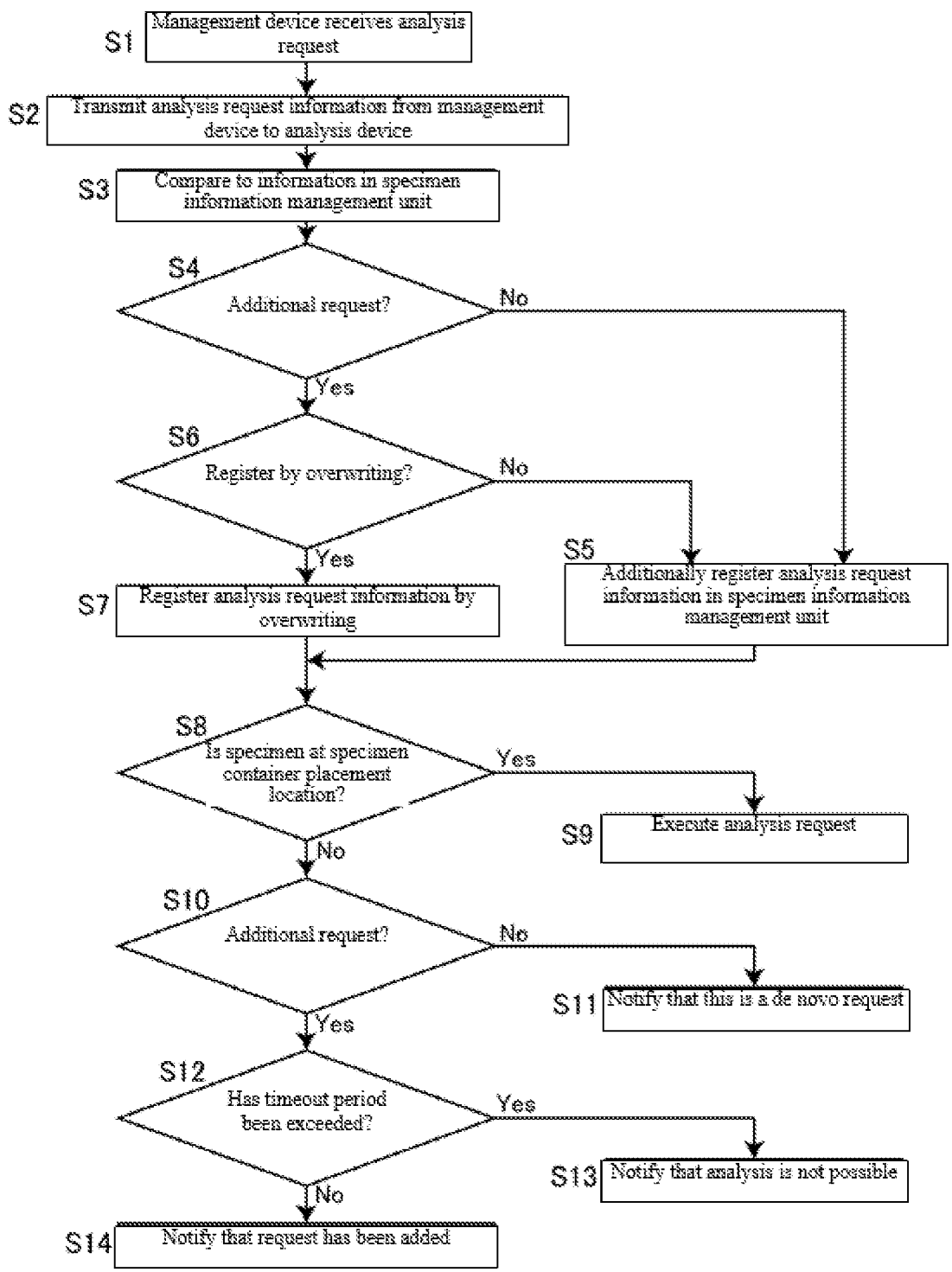
(FIG. 2)

AUTOMATIC ANALYSIS SYSTEM

This is a National Stage Application of PCT/JP2016/074839; filed on Aug. 25, 2016.

TECHNICAL FIELD

The present invention relates to an automatic analysis system used for clinical laboratory tests such as biochemistry, immunoassay, blood analysis, etc.

BACKGROUND ART

Automatic analysis systems are known, which automatically perform analysis on samples such as blood (for example, see Patent Literature 1). Automatic analysis systems are configured such that, when a sample container into which a sample has been placed is secured to a rack and the rack is placed at a predetermined placement location, that rack is automatically transported into an analysis device, and analysis of parameters designated by the physician or other user is performed on the sample.

In automatic analysis systems, generally, the analysis device which performs analysis on samples is connected to a host computer (management device) and is designed to operate based on information from the host computer. The sample to be analyzed is identified based on identification information such as a bar code affixed to the sample container, and that identification information is registered with the host computer. The analysis requestor registers the analysis parameters which the requestor wishes to have performed on each registered sample with the host computer as an analysis request, whereupon the identification information of samples for which analysis was requested is transmitted, along with information on the corresponding analysis parameters, to the analysis device, and the analysis device performs analysis on the samples based on analysis request information transmitted from the host computer.

PRIOR ART LITERATURES

Patent Literatures (Patent Literature 1) WO2015/121919A1

SUMMARY OF THE INVENTION

Problem to be Solved by the Invention

Automatic analysis systems as described above are configured such that all the sample containers which have been placed at the predetermined placement location are transported to the analysis unit of the analysis device, the identification information of each sample container is read, the analysis request information for a given sample is looked up based on information which has been registered with the host computer, and the requested analysis parameters are executed on samples for which analysis was requested. Moreover, analysis results for each sample in the analysis device are transmitted in real time to the host computer, and the physician or other user is able to confirm the analysis results in real time via a terminal connected to the host computer.

If the analysis requestor, having confirmed the analysis results via the terminal, wishes to additionally perform analysis of the same or a different parameter on a particular sample, registration of the additional analysis request can be performed with the host computer from the analysis requestor's terminal. In this way, when an analysis request for a particular sample has been additionally registered after analysis operation by the analysis device has been initiated, if the sample for which additional analysis has been requested has not yet been introduced into the analysis unit, the subsequently added analysis parameters will also be executed based on the analysis request information registered with the host computer once that sample is introduced into the analysis unit of the analysis device.

However, in the case where the sample has already been introduced into the analysis unit and has been discharged from the analysis unit, analysis of the added parameters will not be carried out unless the sample is returned to the predetermined placement location. In conventional analysis systems, unless a sample is placed in a predetermined placement location of the analysis device and introduced into the analysis unit, information as to whether an analysis request was made with respect to that sample will not be transmitted to the analysis device from the host computer. Thus, in some cases, the operation would be performed whereby, after analysis on all samples has been completed, once a certain time has elapsed, all the samples which have been discharged from the analysis unit would be again placed at the predetermined placement location to check if an additional analysis request has been made.

However, under such operation, the samples for which analysis has not been requested will also all be introduced into the analysis unit, and analysis will be performed only on samples for which analysis was requested while confirming whether or not there was a request for analysis, so a long time would be required to obtain analysis results for the samples for which analysis was requested.

It is therefore an object of the present invention to make it possible, in an automatic analysis system, to ascertain the existence of an analysis request for a sample on the analysis unit side without introducing the sample into the analysis unit.

Means for Solving the Problem

The automatic analysis system of the present invention comprises an analysis device which has an analysis unit that performs analysis on samples, and which introduces sample containers, to which sample identification information has been affixed and which have been placed at a predetermined placement location, into said analysis unit to perform analysis of the samples held in those sample containers; and a management device which has a function of transmitting identification information for a sample to said analysis device when analysis is requested for that sample. Said analysis device comprises: a sample recognition unit which recognizes samples by reading identification information affixed to an aforesaid sample container when that sample container is introduced into said analysis unit; a sample information management unit which retains sample identification information transmitted from said management device as analysis-requested sample information and retains identification information for samples which have been analyzed by said analysis unit as analysis-completed sample information; and a control unit which controls the operation of said analysis unit such that said analysis unit only analyzes samples for which analysis has been requested, based on sample identification information recognized by said sample recognition unit and said analysis-requested sample information retained by said sample information management unit.

Said analysis device preferably additionally comprises an analysis request determination unit which, when identification information for a sample for which analysis has been newly requested has been transmitted from said management device, compares the identification information of said sample to identification information retained by said sample information management unit and determines whether or not the analysis request qualifies as an additional request for a sample for which analysis has already been requested or on which analysis has already been performed. When a new analysis request is made, this makes it possible to rapidly determine, on the analysis device side, if the analysis request is an additional request or not, without having to introduce the sample container into the analysis unit and read its identification information.

Said analysis device preferably additionally comprises an analysis request notification unit which notifies the user when said analysis request determination unit has determined that a new analysis request qualifies as an aforesaid additional request. This makes it possible for the user on the analysis device side to quickly recognize that an additional request has been made.

An analysis may in some cases be request for a sample after a long period time has elapsed since that sample was analyzed. If a long period of time has elapsed since the previous analysis, the sample may have dried out or become denatured and it may not be possible to perform proper analysis on it. Thus, said sample information management unit is preferably configured to store, for a sample which has been analyzed by said analysis unit, the date and time when that sample was analyzed by said analysis unit; and said analysis request notification unit is preferably configured to notify the user when said analysis request determination unit has determined that a new analysis request qualifies as an aforesaid additional request and that the additional request was made after a preset timeout period had elapsed from the date and time of the previous analysis that had been performed on that sample. This allows the user to recognize when an additional request is made for a sample for which a long period of time has elapsed since the previous analysis, making it possible to prevent analysis from being carried out on samples in a condition which does not allow proper analysis.

It should be noted that the period of time after which it becomes impossible to perform proper analysis differs depending on the sample and the environment. Thus, the analysis device may additionally comprise a timeout period setting unit which allows the user to set said timeout period. This allows the user to set an appropriate timeout period according to the sample and the environment.

When an additional request is made with respect to a sample, the sample container of the sample for which the additional request was made may in some cases still be at the predetermined placement location, but various other cases are also conceivable, such as the case where the sample is being transported to the analysis unit, the case where the sample has been introduced into the analysis unit, or the case where the sample has already been discharged from the analysis unit. In such cases, even if it is known that the newly made analysis request is an additional request, it would be difficult for the user on the analysis device side to handle the request without knowing where that sample is located.

Thus, said sample recognition unit is preferably configured to recognize samples which have been introduced into said analysis unit and samples which have been discharged from said analysis unit based on said identification information; said sample information management unit is preferably configured to also manage location information of said samples based on signals from said sample recognition unit; and said analysis device preferably additionally comprises a sample location recognition unit which recognizes the location of a sample for which analysis has been newly requested based on information from said sample information management unit when a new analysis request is determined to qualify as an aforementioned additional request by said analysis request determination unit. This allows the analysis device to ascertain the location of a sample for which an additional request has been made.

In the case described above, said analysis request notification unit is preferably configured to notify the user of the location of a sample when a new analysis request is determined to qualify as an aforementioned additional request by said analysis request determination unit and the sample is not at the aforementioned predetermined placement location. This makes it possible for the user on the analysis device side to easily ascertain the location of a sample for which an additional request has been made and makes it easier to handle the additional request.

Furthermore, the analysis request notification unit may be configured to notify the user that there is a sample for which analysis has been requested de novo when identification information for a sample for which analysis has been newly requested has been transmitted from said management device, the new analysis request has been determined to not qualify as an aforementioned additional request by said analysis request determination unit, and the sample is not at the aforementioned predetermined placement location. This makes it possible for the user on the analysis device side to easily recognize that a new analysis request has been made for a sample which is not at the predetermined placement location.

In the case described above, the analysis request notification unit is preferably configured to also notify the user of the location of the sample. This makes it possible for the user on the analysis device side to easily ascertain the location of a sample for which an additional request has been made and makes it easier to handle de novo requests.

Effect of the Invention

In the automatic analysis system of the present invention, the analysis device comprises a sample information management unit which retains sample identification information transmitted from the management device as analysis-requested sample information and retains identification information for samples which have been analyzed by the analysis unit as analysis-completed sample information, thus making it possible to manage whether or not analysis has been requested and whether or not analysis has been performed for each sample on the analysis device side. This makes unnecessary the operation, as in conventional systems, whereby all samples on which analysis has been completed are returned to a predetermined placement location to verify if there are any additional analysis requests.

BRIEF DESCRIPTION OF THE DRAWINGS

FIG. 1 A block diagram schematically illustrating an embodiment example of an automatic analysis system.

FIG. 2 A flow chart illustrating an example of the operation of the same embodiment example.

MODES FOR EMBODYING THE INVENTION

An embodiment of the automatic analysis system according to the present invention will be described below using the drawings.

First, the overall configuration of the automatic analysis system will be described using FIG. 1.

The automatic analysis system of this embodiment example comprises an analysis device 2, management device 4 and terminal 6. Users of this automatic analysis system include users who place sample containers at a predetermined placement location on the analysis device 2 side and cause the analysis device 2 to perform analysis (hereinafter referred to as "analyst") and users, such as physicians, who request analysis of a sample, and look up analysis results and make further analysis requests via the terminal 6 (hereinafter referred to as "analysis requestor").

The analysis requestor requests analysis of a sample to which identification information has been affixed. The identification information of the sample is retained by an identification information medium such as an IC chip or bar code affixed to the sample container holding the sample. The analysis request is registered with the management device 4 in association with identification information and information on the requested analysis parameters. Once an analysis request is registered with the management device 4, the corresponding information is transmitted to the analysis device 2, and is retained as analysis-requested sample information by a sample information management unit 14 provided in the analysis device 2. The sample container with an affixed identification information medium is placed at a predetermined placement location provided in the analysis device 2. Normally, multiple sample containers are housed in a common rack and are placed in that state at the placement location of the analysis device 2, and are introduced one rack at a time into the analysis unit 8.

The management device 4 has multiple terminals 6 connected to it and is designed to handle analysis requests from multiple analysis requestors. In other words, analysis requests from multiple analysis requestors are managed by a common management device 4. FIG. 1 illustrates a single analysis device 2, but it is also possible for multiple analysis devices 2 to be connected to a common management device 4.

The analysis device 2 performs analysis of samples based on analysis request information from the management device 4, and the analysis results are transmitted in turn to the management device 4. The management device 4 transmits the analysis results data, which has been transmitted to it from the analysis device 2, to the terminal 6 of the analysis requestor who requested the given analysis. The analysis requestor can thereby confirm the results in real time via the terminal 6 once the analysis of samples requested by that analysis requestor has been carried out.

Furthermore, information on samples placed in the analysis device 2 is transmitted to the terminal 6 via the management device 4, and it is made possible for an analysis requestor to transmit analysis requests for any of the samples via the terminal 6 to the management device 4. The management device 4, upon receiving analysis requests from the terminal 6, successively transmits information pertaining to those requests to the analysis device 2. Analysis request related information transmitted from the management device 4 to the analysis device 2 is retained in the sample information management unit 14 as analysis-requested sample information.

The analysis device 2 comprises an analysis unit 8, sample recognition unit 10, control unit 12, sample information management unit 14, analysis request determination unit 16, sample location verification unit 18, analysis request notification unit 20 and timeout period setting unit 22. The control unit 12, analysis request determination unit 16, sample location verification unit 18, analysis request notification unit 20 and timeout period setting unit 22 are functions obtained by executing a program stored in a storage device forming part of the analysis device 2 on a CPU (central processing unit). Furthermore, the sample information management unit 14 is a function implemented by means of a region in the storage device forming part of the analysis device 2.

The analysis unit 8 samples from introduced sample containers and performs analysis thereon. Although illustration of this has been omitted, the analysis device 2 is provided with a transport mechanism which successively introduces sample containers which have been placed at a predetermined placement location to the analysis unit 8.

The sample recognition unit 10, which may be for example a bar code reader, reads an identification information medium affixed to the sample container.

The control unit 12 is configured to control the operation of the analysis unit 8 based on identification information of the sample container read by the sample recognition unit 10 and the analysis request information for each sample retained in the sample information management unit 14, so that the analysis of requested parameters is performed on the sample for which the analysis was requested. Namely, when a sample container is introduced into the analysis unit 8, identification information of the sample container is read by the sample recognition unit 10, the analysis request information for the sample of that sample container is looked up from the sample information management unit 14, and the requested analysis parameters are executed. If there is no analysis request for the sample of the sample container whereof the identification information was read, that sample container is discharged from the analysis unit 8 and stored in a predetermined storage unit without performing analysis.

The sample information management unit 14 is configured to retain identification information for samples for which analysis was requested and information on analysis parameters requested as the parameters to be executed on those samples, transmitted from the management device 4, as analysis-requested sample information, and is configured to retain identification information of samples which have already been analyzed by the analysis unit 8 and information on the analysis parameters which have already been performed on those samples as analysis-completed sample information.

The analysis request determination unit 16 is configured to determine whether or not an analysis request qualifies as an "additional request" based on the identification information of the sample for which the analysis was requested and the information retained in the sample information management unit 14 whenever analysis request related information is transmitted from the management device 4. "Additional request" refers to an analysis request made for a sample for which an analysis request has already been made or on which analysis has already been performed. Namely, when information relating to a new analysis request is transmitted from the management device 4, the analysis request determination unit 16 searches for identification information matching the identification information of the sample for which analysis was newly requested from among the analysis-requested sample information and analysis-completed sample information retained by the sample information management unit 14, and determines the analysis request to be an "additional request" if matching identification information is present. In the following, "de novo request" refers to an analysis request made in respect of a sample which has not been registered in analysis-requested sample information or analysis-completed sample information of the sample information management unit 14.

The sample location verification unit 18 is configured to verify the location of a sample container based on information of the sample recognition unit 10. In this embodiment example, the sample recognition unit 10 has the function of reading identification information of sample containers introduced into the analysis unit 8, and the function of reading identification information of sample containers discharged from the analysis unit 8. Reading of identification information of sample containers by the sample recognition unit 10 upon introduction into the analysis unit 8 and upon discharge from the analysis unit 8 makes it possible to verify the location of each sample container as to whether it is at the sample container placement location, or if it has been introduced into and is in the analysis unit 8, or if it has already been discharged from the analysis unit 8.

The analysis request notification unit 20 is configured to notify the analyst when analysis request related information is transmitted from the management device 4, by giving notification of that analysis request related information as necessary.

When information relating to a new analysis request has been transmitted from the management device 4 to the analysis device 2, if the sample container of the sample to which the request pertains is located at the predetermined placement location, the analysis parameters requested for that sample can be executed by the analysis unit 8, and there is no need to inform the analyst about an additional request or de novo request. Therefore, when information relating to a new analysis request has been transmitted from the management device 4 to the analysis device 2, in this embodiment example, the analysis request notification unit 20 does not provide any notification to the analyst if the sample container of the sample to which the request pertains is located at the predetermined placement location.

Notification of the analyst when information relating to a new analysis request has been transmitted from the management device 4 to the analysis device 2 becomes necessary if the sample container of the sample to which the request pertains has already been introduced into the analysis unit 8 or discharged from the analysis unit 8, or if the relevant sample has not been placed yet into the analysis device 2 or is otherwise not present at the predetermined placement location. In such cases, the analysis requested for that sample cannot be executed unless the analyst places its sample container at the predetermined placement location.

Therefore, in this embodiment example, the analysis request notification unit 20 is configured to notify the analyst of the fact that an additional request or de novo request has been made when information relating to a new analysis request has been transmitted from the management device 4 to the analysis device 2 and the sample container of the sample to which the request pertains is not present at the predetermined placement location. Methods of notifying the analyst which may be mentioned include the method displaying messages such as "Additional request received" and "De novo request received" on a liquid crystal display or other displaying device provided in the analysis device 2, and the method of performing status display by displaying "Uncompleted test parameters" or the like in the area of the sample in question on a sample status display screen which can be displayed on a displaying device. The method of listing samples for which an additional request or de novo request has been received on the aforementioned displaying device, the method of transmitting a notification email to a preregistered email address and the like may also be mentioned.

It is preferable to also display location information indicating where the sample for which an additional request or de novo request has been made is currently located, along with the aforementioned analysis request related information. Showing such location information to the analyst makes it possible for the analyst to easily ascertain the state of the sample for which an additional request or de novo request has been made, making it easier to handle the request.

Furthermore, the analysis request notification unit 20 is preferably configured such that, when notifying the analyst of the fact that there is an additional request, if the date and time at which the new analysis request was made exceeds a predetermined timeout period from the date and time when the previous analysis was performed on the sample to which that request pertains, notification of this fact is given as well. If a sufficiently long period has elapsed from the date and time of the previous analysis, the sample may have dried out or become denatured and it may in some case not be possible to perform proper analysis on it. Therefore, by having the device automatically determine if proper analysis is possible on a sample by verifying the time elapsed since the previous analysis, it becomes possible to prevent improper analysis from being carried out.

It should be noted that the "timeout period" which serves as the criterion for whether or not proper analysis is possible is preset, but can vary depending on the type of sample, the environment in which the analysis device 2 is installed, and the like. Thus, the analysis device 2 of this embodiment example is provided with a timeout period setting unit 22. The timeout period setting unit 22 has the function of allowing the user to set the timeout period which serves as a criterion for determining if analysis can be performed again on a sample when an additional request is made for that sample.

To make it possible to determine whether or not the aforementioned timeout period has elapsed, the sample information management unit 14 is configured to also retain the date and time when analysis was performed on a sample as analysis-completed sample information.

Next, the operation of this embodiment example will be described using the flow chart of FIG. 2 along with FIG. 1.

First, when the management device 4 receives an analysis request (step S1), analysis request information is transmitted from the management device 4 to the analysis device 2 (step 2). In the analysis device 2, identification information for the sample to which the analysis request transmitted from the management device 4 pertains is compared to analysis-requested sample information and analysis-completed sample information retained in the sample information management unit 14 (step S3), and it is determined if the analysis request qualifies as an additional request (step S4).

If the newly made analysis request does not qualify as an additional request, the analysis request information is additionally registered as analysis-requested sample information with the sample information management unit 14 (step S5). If the newly made analysis request qualifies as an additional request, in the case that the analysis information is not to be registered by overwriting a previously made analysis request, the analysis request information is additionally registered as analysis-requested sample information in the sample information management unit 14 (step S5), and when registering by overwriting, the information in the sample information management unit 14 is overwritten (step S7). Analysis request information is registered by overwriting in cases where a new analysis parameter is added using the same sample (when the state of the sample is the same, that is, when the same sample cup is used and the sample pre-dilution ratio is the same). Furthermore, registering as a new request rather than overwriting is performed in cases where analysis has been again requested for an already performed analysis parameter or in cases where, regardless of the additionally requested analysis parameter, the sample is the same but its state is different (the sample cup is different or the sample pre-dilution ratio is different).

Next, the location of the subject sample container is verified based on information from the sample recognition unit 10 (step S8). If the sample container is at the predetermined placement location, the requested analysis parameters are executed on that sample (step S9). If the subject sample container is not at the predetermined placement location and the analysis request does not qualify as an "additional request," the analyst is notified that a de novo request has been made (steps S10 and S11). If the subject sample container is not at the predetermined placement location and the analysis request qualifies as an "additional request," it is determined if a predetermined timeout period has been exceeded since the date and time of the analysis previously performed on that sample (step S12). If the timeout period has been exceeded, the analyst (and if necessary, the analysis requestor) is notified that the sample cannot be analyzed again, and if the timeout period has not been exceeded, the analyst is notified that a request has been added.

EXPLANATION OF REFERENCE SYMBOLS

2 Analysis device
4 Management device
6 Terminal
8 Analysis unit
10 Sample recognition unit
12 Control unit
14 Sample information management unit
16 Analysis request determination unit
18 Sample location verification unit
20 Analysis request notification unit
22 Timeout period setting unit

The invention claimed is:

1. An automatic analysis system comprising: an analysis device which has an analyzer configured to perform analysis on specimens in specimen containers introduced into said analyzer, wherein specimen identification information has been affixed to the specimen containers and the specimen containers have been placed at a predetermined placement location, into said analyzer to perform analysis of the specimens held in those specimen containers; and
    a computer configured to transmit identification information for a specimen to said analysis device when analysis is requested for that specimen,
    wherein said analysis device comprises: a specimen recognition unit reader configured to recognize specimens by reading identification information affixed to an aforesaid specimen container when that specimen container is introduced into said analyzer; a specimen information management memory configured to retain specimen identification information transmitted from said computer as analysis-requested specimen information and to retain identification information for specimens which have been analyzed by said analyzer as analysis-completed specimen information; and an analyzer controller configured to control operation of said analyzer such that said analyzer only analyzes specimens for which analysis has been requested, based on specimen identification information recognized by said specimen recognition reader and said analysis-requested specimen information retained by said specimen information management memory,
    wherein said analysis device comprises an analysis request determination unit configured to, when identification information for a specimen for which analysis has been newly requested has been transmitted from said computer, compare the identification information of said specimen to identification information retained by said specimen information management memory and determine whether or not the analysis request qualifies as an additional request for a specimen for which analysis has already been requested or on which analysis has already been performed.

2. The automatic analysis system as set forth in claim 1, wherein said analysis device additionally comprises an analysis request notification unit configured to notify the user when said analysis request determination unit has determined that a new analysis request qualifies as an aforesaid additional request.

3. The automatic analysis device as set forth in claim 2, wherein said specimen information management memory is configured to store, for a specimen which has been analyzed by said analyzer, the date and time when that specimen was analyzed by said analyzer; and
    said analysis request notification unit is configured to notify the user when said analysis request determination unit has determined that a new analysis request qualifies as an aforesaid additional request and that the additional request was made after a preset timeout period had elapsed from the date and time of the previous analysis that had been performed on that specimen.

4. The automatic analysis device as set forth in claim 3, wherein said analysis device additionally comprises a timeout period setting unit configured to allow the user to set said timeout period.

5. The automatic analysis device as set forth in claim 1, wherein said specimen recognition reader is configured to recognize specimens which have been introduced into said analyzer and specimens which have been discharged from said analyzer based on said identification information;
    said specimen information management memory is configured to also manage location information of said specimens based on signals from said specimen recognition reader; and
    said analysis device additionally comprises a specimen location recognition unit which recognizes the location of a specimen for which analysis has been newly requested based on information from said specimen information management memory when a new analysis request is determined to qualify as an aforementioned additional request by said analysis request determination unit.

6. The automatic analysis device as set forth in claim 5, wherein an analysis request notification unit is configured to notify the user of the location of a specimen when a new analysis request is determined to qualify as an aforementioned additional request by said analysis request determination unit and the specimen is not at the aforementioned predetermined placement location.

7. The automatic analysis device as set forth in claim 5, wherein an analysis request notification unit is configured to notify the user that there is a specimen for which analysis has been requested de novo when identification information for a specimen for which analysis has been newly requested has been transmitted from said computer, the new analysis request has been determined to not qualify as an aforementioned additional request by said analysis request determination unit, and the specimen is not at the aforementioned predetermined placement location.

8. The automatic analysis device as set forth in claim 7, wherein said analysis request notification unit is configured to notify the user of the location of the specimen when identification information for a specimen for which analysis has been newly requested has been transmitted from said computer, the new analysis request has been determined to not qualify as an aforementioned additional request by said analysis request determination unit, and the specimen is not at the aforementioned predetermined placement location.

* * * * *